& # 9;

(12) United States Patent
Jean-Dominique et al.

(10) Patent No.: US 6,735,613 B1
(45) Date of Patent: May 11, 2004

(54) SYSTEM FOR PROCESSING BY SETS OF RESOURCES

(75) Inventors: Sorace Jean-Dominique, Lancey (FR); Walehlane Nasr-Eddine, Eybens (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/447,829

(22) Filed: Nov. 23, 1999

(30) Foreign Application Priority Data

Nov. 23, 1998 (FR) ............................................ 98 14725

(51) Int. Cl.$^7$ ................................................ G06F 9/00
(52) U.S. Cl. ...................... 709/104; 709/102; 709/105; 709/107; 711/170; 711/203
(58) Field of Search ................................ 709/102, 104, 709/105, 107; 711/170, 203

(56) References Cited

U.S. PATENT DOCUMENTS 5,784,697 A * 7/1998 Funk et al. ................... 711/170
6,105,053 A * 8/2000 Kimmel et al. .............. 709/105

FOREIGN PATENT DOCUMENTS

EP   0 798 639 A   10/1997

OTHER PUBLICATIONS

Parsons E.W. et al.: "Coordinated Allocation of Memory and Processors in Multiprocessors" 1996 ACM Sigmetrics International Conference on Measurement and Modeling of Computer Systems, Philadelphia, PA, May 23–26, 1996, May 23, 1996, pp. 57–67; XP000679315 Association for Computing Machinery ISBN: 0–89791–793–6 p. 63, left hand column.

* cited by examiner

Primary Examiner—Anil Khatri
Assistant Examiner—Thomas Pham
(74) Attorney, Agent, or Firm—Miles & Stockbridge, P.C.; Edward J. Kondracki

(57) ABSTRACT

A computer system having physical resources including a plurality of processors (10, 11, 12, 13, 20, 21, 22, 23) and a physical memory (14, 24) for executing processes in a virtual address space by means of a virtual storage manager (59) that maps real pages of physical memory with virtual pages of the virtual address space. A scheduler (55) is arranged for scheduling the execution of threads of processes in the processors. The computer system includes at least one named set of physical resources RS (50, 51, 52) including a given number of identified processors (10, 11, 12, 13) and a given number of identified real pages (18, 19, 36). The scheduler (55) is configured to have a thread of an identified process executed by one or more of the processors of the set RS and the virtual storage manager (61) maps a real page of the set RS to a virtual page if the thread causes a page fault.

18 Claims, 3 Drawing Sheets

SYSTEM FOR PROCESSING BY SETS OF RESOURCES

BACKGROUND OF THE INVENTION

1. Field of the Invention

A field of the invention relates to the allocation of shared resources of a computer system to various applications for which processes are executed as a function of their specific needs. The computer system comprises physical resources, software resources, and an operating system for the resources so that applications can be run on them.

2. Description of Related Art

Among the physical resources, the processors, the physical memory and the input-outputs will essentially be distinguished. The processors execute processes using data and instruction sequences contained in physical memory. The input-outputs allow the processes to exchange data with peripheral devices such as, to give an incomplete list, mass storage devices, printers, telecommunication couplers, screens and keyboards.

Associated in- a known way with the physical memory and the input-outputs is a real address space whose size is adapted to the size of the physical memory and to the number of input-outputs. In order for the execution of the processes not to be limited by the size of the physical memory, the processes have a virtual address space whose size is larger than that of the real address space. The virtual address space is divided into several segments so that each process uses certain segments, either exclusively or in a shared fashion. A segment is constituted by virtual pages, each of which can be mapped to a real page (or frame) of identical size by means of a virtual storage manager. A page fault is generated when a process executes an instruction on a virtual page to which no real page corresponds. The virtual storage manager then takes care of requisitioning a real page, in order to map it to the virtual page, either from the available pages or, if there are no real pages available, from used pages, possibly saving the contents of the real page in mass storage and replacing its mapping. Hence, each page fault slows down the execution of an instruction on a virtual page by the process in question.

For a process, the page fault probability p per instruction decreases when the size of the physical memory, and hence the efficiency e(p) of the system, increases. The current low cost of memory makes it possible to equip the computer system with a physical memory of large size, several gigabytes. If the virtual storage manager uses all of the physical memory for each process, the page fault probability p per instruction is inversely proportional to the size of the physical memory. However, this solution is not entirely satisfactory, and in fact it is noted that the performance of the system does not necessarily increase in a linear fashion with the size of the physical memory. There are many possible causes, such as an increase in the probability of deadlocks in the sharing of resources, widespread fragmentation, which is exacerbated in the case of a non-uniform access memory, and the danger of a requisitioning of the entire memory by one process.

One solution, which consists of allocating the memory in areas of equal-size among processes is unsatisfactory, since dividing the size of the memory by the number of processes increases the page fault probability p and accordingly decreases the efficiency of the system for the processes that require an address space whose size is larger than that of one area.

Another solution consist of assigning each process an area whose size is adapted to its estimated needs and limiting it to stay within that size. This solution also is not very satisfactory since it monopolizes part of the physical memory even if the process is inactive, and it is insensitive to any increase in its needs beyond its estimated needs.

In order to increase the speed of execution of the processes in the system, the latter comprises several processors. Thus, several processes can execute their instructions simultaneously, each executing in a different processor. Moreover, if the execution of a process can be broken down into several instruction streams (or threads) that can be executed in parallel, a process can be executed simultaneously in several processors, each of which is assigned a thread. A scheduler is responsible for allocating the processors to the processes as a function of the availability of the resources. A priori, the more processors the scheduler has at its disposal, the greater the number of threads that can be executed simultaneously. However, it is noted that the performance of the system does not necessarily increase in a linear fashion with the number of processors. There are many possible causes, such as for example the fact that the processes are in contention for the resources of the system.

SUMMARY OF THE INVENTION

To eliminated the drawbacks of the prior art mentioned above, the subject of the invention is a computer system comprising physical resources of the processor type and the physical memory type, for executing processes in a virtual address space by means of a virtual storage manager that maps real pages of physical memory to virtual pages of the virtual address space, and a scheduler for scheduling the execution of threads of the processes in the processors. The computer system comprises at least one named set of physical resources RS, constituted by a given number of identified processors and by a given number of identified real pages, so that the scheduler can have a thread of an identified process executed by one or more of the processors of the set RS, and so that the virtual storage manager can map a real page of the set RS to a virtual page when a page fault caused by the thread appears.

Thus, the execution of a thread of an identified process by one or more processors of the set RS constituted by a given number of identified processors does not disturb the execution of other threads by processors not included in the set RS. The mapping of a real page of the set RS to a virtual page when a page fault caused by this thread appears does not interfere with the mapping of real pages not included in the set RS. The fact that the set RS is named allows it to be recognized by the scheduler and by the manager in connection with an identified process.

BRIEF DESCRIPTION OF THE DRAWINGS

Other advantages and details appear in an exemplary embodiment of the invention described herein in reference to the figures, in which.

DESCRIPTION OF THE PREFERRED EMBODIMENTS

Figure 1:
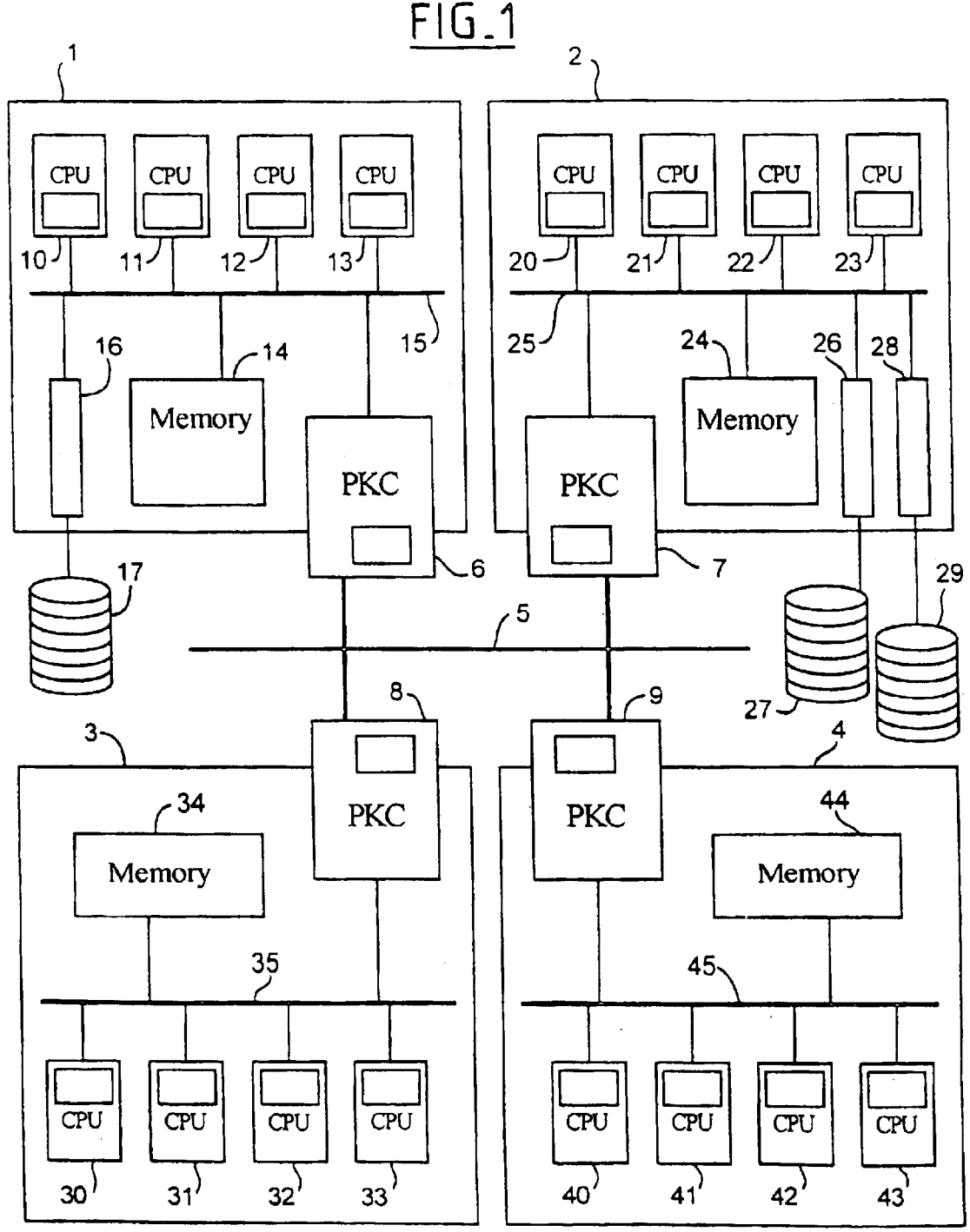
FIG. 1 represents a computer system.

Referring to FIG. 1, a data processing machine comprises a number n of modules implemented by means of a common operating system OS. A module 1 comprises one or more processors 10, 11, 12, 13 of the central processing unit type CPU and one memory 14, local to the module 1. A module 2 comprises one or more processors 20, 21, 22, 23 of the central processing unit type CPU and one memory 24, local to the module 2. A module 3 comprises one or more processors 30, 31, 32, 33 of the central processing unit type CPU and one memory 34, local to the module 3. A module 4 comprises one or more processors 40, 41, 42, 43 of the central processing unit type CPU and one memory 44, local to the module 4. The example presented, in which the number n is equal to 4, is not limiting, either in terms of a lower number or a higher number of modules.

Each module 1, 2, 3, 4 respectively comprises an interconnection device 6, 7, 8, 9. The interconnection devices 6, 7, 8, 9 communicate with one another physically by means of a link 5.

A set comprising all or part of the memory 14, all or part of the memory 24, all or part of the memory 34 and all or part of the memory 44 constitutes a physical memory resource set MP for the operating system OS of the machine.

In order to access a resource in the physical memory MP, a processor 10, 11, 12, 13 located in the module 1 generates an access request through a bus 15, local to the module 1. The access request comprises a real address AP of the resource. Upon detecting the real address AP in the bus 15, the interconnection device 6 physically takes control of the bus 15 in order to analyze the real address AP. If the real address AP is that of a resource resident in the memory 14 and this resource is up to date, the interconnection device 6 leaves it up to the memory 14 to transmit the required resource to the bus 15 in order to respond to the request. If not, the interconnection device 6 takes care of transmitting the requested resource to the bus 15. If the interconnection device 6 does not have the requested resource locally in the module 4, the interconnection device 6 then generates an access request through the link 5. The interconnection device 7, 8, 9 of the respective remote module 2, 3, 4 that has the requested resource transmits it to the interconnection device 6.

The hardware mechanism just described is identical for each of the n modules 1, 2, 3, 4 of the machine. The preceding explanations relative to the bus 15 apply to a bus 25 for the components of the module 2, to a bus 35 for the components of a module 3, and to a bus 45 for the components of the module 4. This hardware mechanism is invisible from the operating system OS, which sees all of the resources of the physical memory MP by means of their real addresses AP, without a priori distinguishing the locality of these resources to a particular module.

However, the time the hardware mechanism takes to respond to an access request generated by a processor local to a module is shorter if the requested resource is available locally in this module than if the requested resource is available in a remote module. That is why the physical memory MP is said to have non-uniform access.

In addition to the resources of the processor type CPU and the resources of the memory type, the computer system comprises resources of the input-output type. The module 1 comprises a coupler 16 accessible by the processors through the bus 15 by means of the real address space. The module 2 comprises couplers 26, 28 accessible by the processors through the bus 25 by means of the real address space. The couplers 16, 26, 28 constitute input-output channels to respective optical or magnetic storage units 17, 27, 29 such as disks. The units 17, 27, 29, constitute the mass storage of the system.

Figure 2:
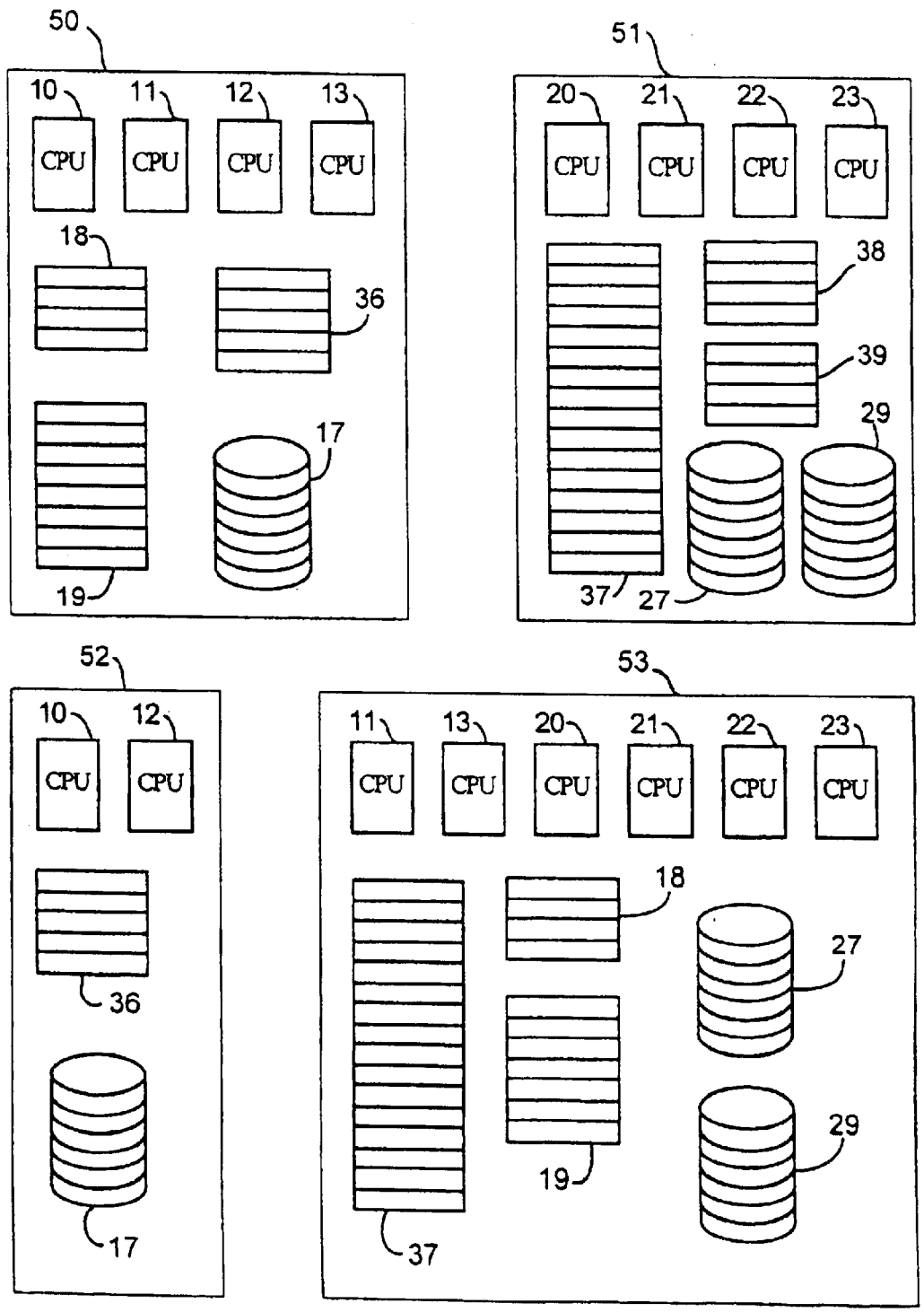
FIGS. 2 and 3 represent a resource set architecture.

Referring to FIG. 2, the resources of the system are grouped into resource sets RS 50, 51, 52, 53 Each resource set 50, 51, 52, 53 is named and constitutes an available collection of processors and physical storage areas. The set 50 comprises the processors 10, 11, 12, 13, the storage areas 18, 19, 36. The set 51 comprises the processors 20, 21, 22, 23, the storage areas 37; 38, 39. The set 52 comprises the processors 10, 12, the storage area 36. The set 53 comprises the processors 11, 13, 20, 21, 22, 23, the storage areas 18, 19, 37. The sets RS constitute objects for the execution of processes and operations linking them to the memory affinity. A physical storage area 18, 19, 36, 37, 38, 39 is a set of real pages or frames of contiguous real addresses. By defining the storage areas 18, 19 and 36 as three complementary sets of the memory 14, the resource set 50 comprises the memory and processor resources of the module 1. By defining the storage areas 37, 38 and 3.9 as three complementary sets of the memory 24, the resource set 51 comprises the memory resources and processors of the module 2. The sets 50 and 51 constitute basic resource sets BRS of the system.

A resource set RS is defined as a basic resource set BRS when there are one or more non-contiguous sets RS wherein the union with the set BRS contains all the resources of the computer system.

A processor, as well as a physical storage area, can belong to several resource sets RS. For example, the processor 10 belongs to the set 50 and to the set 52, the storage area 37 belongs to the set 51 and to the set 53. In the case of a NUMA machine with several modules, processors of different modules, and possibly of different execution queues, can belong to the same set RS. This is the case, for example, of the processors 11 and 20 that belong to the set 53. It is the case, for example, of the storage areas 19 and 37 that belong to the set 53.

There are immutable sets RS, provided by and for the operating system. There is one set RS for each module that groups the processors and the physical storage areas of the module in question, and one set RS containing all the processors and all the physical storage areas of the computer system. This allows the operating system to always be able to provide a name of a set RS in response to a user request on the topology of the computer system. The user can then specify this name in requests related to the topology.

A resource set can also contain input-output channels. For example, the sets 50 and 52 each comprise the storage unit 17, the sets 51 and 53 each comprise the storage units 27 and 29. This is advantageous when the processors and the physical storage areas are not identified by name but rather requested as a collection of essential resources in order to accommodate the load of an application. In this case, the operating system chooses the processors and the physical storage areas to be entered into a set RS under construction in order to optimize the affinity of the input-output accesses.

The use of resource sets RS can be generalized to a standard SMP system in order to isolate or partition resources in case of an unbalanced load or in case of a load that reduces the execution speed because of proven memory affinity. The sets RS also constitute important information on the execution of applications, and on the usage of the memory and the input-outputs. The observation and utilization of the sets RS for partitioning resource space allows for a better organization of the computer system by the operating system.

A set RS is said to be exclusive when all the resources it contains are declared to be unshared by other sets RS, with the exception of the sets RS specific to the operating system as defined above.

Figure 3:
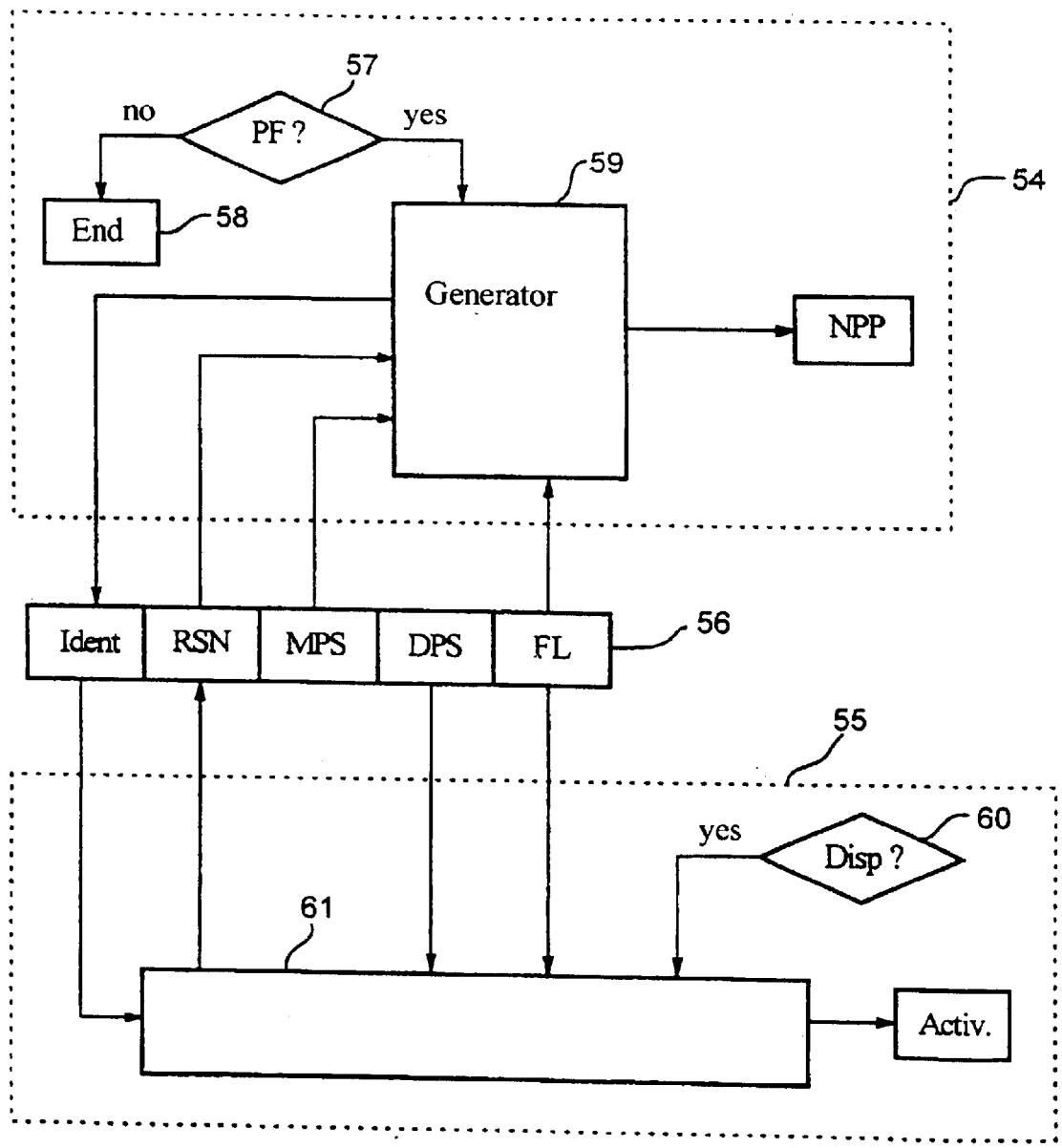

FIG. 3 illustrates an affinity control mechanism for linking an instruction sequence, a process or a group of processes to a specific set RS. This defines the execution and the memory space of the identifier of the target instruction sequence or process.

A link 56 comprises several parameters Ident, RSN, MPS, DPS, FL, wherein:

Ident is an identifier of an instruction sequence, a process, a group of processes, or an indicator designating the process that performs a link edit;

RSN is a name of a set RS;

MPS is a memory policy set;

DPS is a dispatching policy set;

FL indicates a link option: strong or weak.

The value of the link parameter can be modified by means of a command or an application interface.

Each set RS 50, 51, 52, 53 has a distinct name RSN. The memory policy set MPS and the dispatching policy set DPS themselves are not part of the present invention; it is simply important to remember that the memory policy set MPS makes it possible to allocate physical memory resources and the dispatching policy set makes it possible to allocate processors in the set RS as a function of predefined strategies.

A strong link option prevents any utilization of resources outside the set RS named RSN. This option is chosen by a value B_S of the parameter FL.

A weak link option allows utilizations of resources outside the set named RSN in order to balance the load. This option is chosen by a value B_W of the parameter FL.

A change from B_W to B_S generates strong links for any new resource allocations. The previous allocations of resources remain unchanged until they are released.

A change from B_S to B_W generates weak links for any new resource allocation. The previous allocations of resources remain unchanged until they are released.

Generally, no currently allocated resource is deallocated in order to strictly comply with new link properties. Only the allocations of resources following a change must satisfy the new link options.

The default link generating option is B_W.

The link 56 is generated by means of various functions:

B_N for linking a process to a set RS immediately;

B_F for linking a process to a set RS at the time of its creation, for example as a result of a FORK instruction, known in UNIX operating systems;

B_E for linking a process to a set RS at the time of its execution, for example as a result of an EXEC instruction known in UNIX operating systems.

These functions are not exclusive, different combinations are possible:

B_N|B_F: the process itself is immediately linked to a set RS and all the processes generated and instruction sequences created subsequently. This is in fact equivalent to the option B_N since by default, the son processes inherit link properties from their father process.

B_N|B_E: the process itself is immediately linked to a set RS and all the son processes at the time of their execution.

The default function activated is B_N.

A function B_None can be combined with the others since it amounts to unlinking the process from the current set RS. It automatically results in a change from B_S to B_W, leaving it up to the operating system to decide whether or not to link the process to resources outside the set RS in order to balance the load.

In fact, each job part not explicitly linked in the system is implicitly weakly linked to a set RS, for example a set BRS, with a memory and a set of scheduling policies. In the absence of a temporary link generating option, the following rules must be complied with.

When an instruction sequence is created, it has the same link properties as the process that created it. This applies to the initial instruction sequence of a new process created by the process generating subprogram: the new instruction sequence inherits link properties from the instruction sequence that called the process generating or instruction sequence creating subprogram.

When the execution subprogram is called, the link properties are deleted and the operating system dynamically defines the best link properties to choose, and a new set RS, possibly the same one, becomes the target set RS for the program executed.

A virtual storage manager 54 implements this affinity control mechanism. The known page allocation functions are not represented. A real page number generator NPP operates in the following way.

If the manager 54 detects a page fault PF in a step 57, the generator 59 consults the link 56 containing the identifier Ident of the process or the instruction sequence that caused the page fault. In a known way, a page fault PF occurs when the manager 54 does not find a real page that corresponds to a virtual page accessed by the process or the instruction sequence. The link 56 provides the generator 59 with the name RSN of the physical resource set RS to which the process or the instruction sequence is linked.

If the generator 59 finds a real page available in the set RS named RSN, it generates the real page number NPP for other functionalities of the virtual storage manager 54. If the generator 59 does not find a real page available in the set RS named RSN, two cases must be considered. In the case where the value FL of the link 56 is B_S, a known real page allocation replacement mechanism is activated in order to generate the real page number NPP of a page of the set RS. In the case where the value FL of the link 56 is B_W, the real page number NPP of a page of a set RS other than the set named RSN is generated.

The value MPS of the link 56 allows the generator 59 to implement additional functionalities such as the generation of a memory allocation policy link.

If the manager 54 does not detect a page fault PF in step 57, the affinity control mechanism in the manager 54 ends in step 58, allowing the normal functionalities of the manager 54 to continue. The real pages previously mapped with virtual pages are not called into question, even if these real pages do not belong to the set named RSN.

Thus, a page contained in a set of storage areas that belong to the set RS named RSN is a candidate for resolving a page fault of any instruction sequence linked to this set RS.

A process or instruction sequence scheduler 55 implements the affinity control mechanism. The known scheduling functions are not represented. An activator 61 of a process or instruction sequence number Activ operates in the following way.

If the scheduler 55 detects a preemption Disp of a processor CPU in a step 60, the activator 61 retains an identifier Ident of the process or instruction sequence in the link 56 whose name RSN is that of a set RS to which the processor CPU belongs. The activator 61 can also retain an identifier Ident of a process or instruction sequence in the link 56 whose name RSN is not that of a set RS to which the processor CPU belongs, but whose value FL is B_W.

Thus, each processor belonging to the set RS named RSN is therefore a candidate for dispatching any sequence of instructions or processes linked to this set RS.

The value DPS of the link 56 allows the activator 61 to implement additional functionalities such as dispatching policies.

Thus, the affinity control mechanism consists not only of connecting an application to a set RS but also of associating a set RS with an application with the corresponding organization policies.

The set of input-output channels is an additional piece of information that allows the kernel of the operating system to choose in the set RS the best resource for efficiently fulfilling an input-output request.

The named resource sets are not reserved for just one process but for several processes linked to the same resource set RS.

- The possibility for other processors to be linked to the same set RS avoids unnecessarily monopolizing this set when a process that is linked to it is inactive. This possibility avoids having to reduce the size of each set RS in a way that is inversely proportional to the number of processes or having to limit this size to the estimated needs of a process.
- By linking a process to a resource set RS of greater size than its anticipated needs, it benefits from a low page fault probability p while limiting the fragmentation drawback to just the one resource set RS. The needs of the process can exceed its estimated needs.
- By weakly linking a process to a set RS, it is possible to meet its needs in a controlled way by allocating it resources outside the set RS in case of an overload in the set RS.

Each of the functions B_N, B_F, B_E sets the values of the parameters RS, MPS, DPS, FL of a link 56 whose parameter Ident identifies a process or an instruction sequence of a process.

When one of the functions B_N, B_F, B_E is accessible by an application process, i.e., by a process created by an application of a user of the system, the application can be linked to a set RS based on its needs in order to optimize its processing. The application can also modify the links 56 that relate to it for example by naming another resource set RS. This gives the system great flexibility.

When one of the functions B_N, B_F, B_E is accessible by an administrator of the system, he can control the utilization of the system. In particular, by choosing a strong link option B_S and by preventing application users from modifying this option, the administrator can partition the computer system into different sets RS in which the applications are required to be executed. Thus, different users have exclusive access to different resource sets RS. For example, students may have access to only certain resources that are reserved for them, without having access to resources reserved for teachers or other users.

The accessibility of the functions B_N, B_F, B_S is set by the administrator, who has the maximum number of rights in the operating system.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A computer system comprising physical resources including a plurality of processors (10, 11, 12, 13, 20, 21, 22, 23), a physical memory (14, 24) for executing processes in a virtual address space by means of a virtual storage manager (54), said virtual storage manager configured for mapping real pages of physical memory to virtual pages of the virtual address space, a scheduler (55) for scheduling the execution of threads of the processes in the processors, the scheduler (55) being configured to have a thread of an identified process executed by one or more of the processors of at least one named set of physical resources RS (50, 51, 52, 53), said at least one named set of physical resources RS (50, 51, 52, 53) including a given number of identified processors (10, 11, 12, 13) and a given number of identified real pages (18, 19, 36), and the virtual storage manager being configured to map a real page of the set RS to a virtual page when the thread causes a page fault; wherein:

the at least one named set of physical resources RS (50, 51, 52, 53) comprises at least a first named set of physical resources RS (50) and a second named set of physical resources RS (53);

the first named set of physical resources RS (50) contains certain common resources (11, 13, 18, 19) that are also contained in the second set of physical resources RS (53);

the first named set of physical resources RS (50) contains first non-common resources (10, 12, 36) that are not contained in the second set of physical resources RS (53); and the second set of physical resources RS (53) contains second non-common resources (20, 21, 22, 23, 37) that are not contained in the first set of physical resources RS (50).

2. The computer system according to claim 1, further comprising a link (56) for each set RS (50, 51, 52), said link having at least two parameters (Ident, RSN), the first parameter (Ident) being configured to identify an instruction sequence, and the second parameter (RSN) being configured to name a set RS.

3. The computer system according to claim 1, wherein the link (56) comprises one of parameters for memory policies (MPS) or dispatching policies (DPS).

4. The computer system of claim 1 wherein the first non-common resources comprise processors (10, 12), the second non-common resources comprise processors (20, 21, 22, 23), and the common resources comprise processors (11, 13).

5. The computer system according to claim 2, wherein the link (56) comprises a third parameter (FL) for indicating a link option, said link option being one of a strong link option (B_S) or a weak option (B_W), wherein the strong link option (B_S) is arranged to prevent any utilization of a resource outside the set RS, and the weak link option (B_W) is arranged to allow the utilization of resources outside the set RS.

6. The computer system according to claim 2, wherein the link (56) is generated by means of a function (B_N, B_F, B_E) for linking one of a process or an instruction sequence to a named set RS (RSN).

7. The computer system according to claim 2, wherein the link (56) comprises one of parameters for memory policies (MPS) or dispatching policies (DPS).

8. The computer system of claim 4 wherein the first non-common resources comprise at least one identified real page (36), the second non-common resources comprise at least one identified real page (37), and the common resources comprise at least one identified real page (18, 19).

9. The computer system according to claim 5, wherein the link (56) is generated by means of a function (B_N, B_F, B_E) for linking one of a process or an instruction sequence to a named set RS (RSN).

10. The computer system according to claim 5, wherein the link (56) comprises one of parameters for memory policies (MPS) or dispatching policies (DPS).

11. The computer system according to claim 6, wherein the function (B_N, B_F, B_E) is arranged to be accessed by an application process.

12. The computer system according to claim 6, wherein the function (B_N, B_F, B_E) is arranged to be accessed by a computer system administrator.

13. The computer system according to claim 6, wherein the link (56) comprises one of parameters for memory policies (MPS) or dispatching policies (DPS).

14. The computer system according to claim 9, wherein the link (56) comprises one of parameters for memory policies (MPS) or dispatching policies (DPS).

15. The computer system according to claim 11, wherein the link (56) comprises one of parameters for memory policies (MPS) or dispatching policies (DPS).

16. The computer system according to claim 12, wherein the function (B_N, B_F, B_E) allows the administrator of the system to set a strong link option (B_S) so as to limit processes of a given application to a single resource set RS.

17. The computer system according to claim 12, wherein the link (56) comprises one of parameters for memory policies (MPS) or dispatching policies (DPS).

18. The computer system according to claim 16, wherein the link (56) comprises one of parameters for memory policies (MPS) or dispatching policies (DPS).

* * * * *